(12) United States Patent
Kurth (10) Patent No.: US 9,606,016 B2
(45) Date of Patent: Mar. 28, 2017

(54) DEVICES AND METHODS FOR DETERMINING VACUUM PRESSURE LEVELS

(71) Applicant: FLIR Systems, Inc., Wilsonville, OR (US)

(72) Inventor: Eric A. Kurth, Santa Barbara, CA (US)

(73) Assignee: FLIR Systems, Inc., Wilsonville, OR (US)

(*) Notice: Subject to any disclaimer, the term of this patent is extended or adjusted under 35 U.S.C. 154(b) by 352 days.

(21) Appl. No.: 14/140,747

(22) Filed: Dec. 26, 2013

(65) Prior Publication Data

US 2014/0219308 A1  Aug. 7, 2014

Related U.S. Application Data (60) Provisional application No. 61/798,586, filed on Mar. 15, 2013, provisional application No. 61/747,934, filed on Dec. 31, 2012.

(51) Int. Cl.
| | | |
|---|---|---|
| *G01K 15/00* | (2006.01) | |
| *G01L 21/12* | (2006.01) | |
| *G01J 5/04* | (2006.01) | |
| *G01J 5/00* | (2006.01) | |
| *G01M 3/00* | (2006.01) | |
| *G01M 3/34* | (2006.01) | |
| *G01M 3/38* | (2006.01) | |

(52) U.S. Cl.
CPC .............. *G01L 21/12* (2013.01); *G01J 5/045* (2013.01); *G01J 2005/0077* (2013.01); *G01K 15/00* (2013.01); *G01M 3/002* (2013.01); *G01M 3/34* (2013.01); *G01M 3/38* (2013.01)

(58) Field of Classification Search
CPC ....................................................... G01L 21/12
USPC ...... 374/1, 2, 120, 121; 702/99; 250/339.02, 250/339.03, 339.04
See application file for complete search history.

(56) References Cited

U.S. PATENT DOCUMENTS

| | | | |
|---|---|---|---|
| 4,302,674 A * | 11/1981 | Adachi | H01L 37/02 250/338.3 |
| 4,463,262 A | 7/1984 | Contreras | |
| 4,574,263 A | 3/1986 | Liddiard | |
| 4,672,206 A | 6/1987 | Suzuki et al. | |

(Continued)

FOREIGN PATENT DOCUMENTS

| | | |
|---|---|---|
| DE | 4104055 | 11/1997 |
| EP | 0481552 | 4/1992 |

(Continued)

*Primary Examiner* — Lisa Caputo
*Assistant Examiner* — Tran M Tran
(74) *Attorney, Agent, or Firm* — Haynes and Boone, LLP (57) ABSTRACT

A device is disclosed including a substrate; an infrared detector coupled to and thermally isolated from the substrate; and a heat shield coupled to the substrate by a plurality of contacts, the heat shield disposed above the infrared detector to block external thermal radiation from being received by the infrared detector. The heat shield is configured to receive a current through the contacts to heat the heat shield to a first temperature, and the infrared detector is configured to detect the first temperature and provide an output signal that is related to a vacuum pressure within the device. Methods for using and forming the device are also disclosed.

20 Claims, 8 Drawing Sheets

(56) References Cited

U.S. PATENT DOCUMENTS

| | | | |
|---|---|---|---|
| 4,904,090 A * | 2/1990 | Oliver | F25B 21/04 236/94 |
| 5,010,251 A | 4/1991 | Grinberg et al. | |
| 5,021,663 A * | 6/1991 | Hornbeck | G01J 5/02 250/338.1 |
| 5,134,292 A | 7/1992 | Segawa et al. | |
| 5,296,710 A * | 3/1994 | Ohno | G01J 5/061 250/352 |
| 5,369,280 A * | 11/1994 | Liddiard | G01J 5/20 250/332 |
| 5,401,968 A | 3/1995 | Cox | |
| 5,420,419 A * | 5/1995 | Wood | G01J 5/061 250/332 |
| 5,550,373 A | 8/1996 | Cole et al. | |
| 5,583,058 A | 12/1996 | Utsumi et al. | |
| 5,602,393 A | 2/1997 | Gerard | |
| 5,633,077 A | 5/1997 | Olinger | |
| 5,760,398 A | 6/1998 | Blackwell et al. | |
| 5,763,885 A * | 6/1998 | Murphy | G01J 5/061 250/332 |
| 5,777,329 A | 7/1998 | Westphal et al. | |
| 5,789,753 A | 8/1998 | Gooch et al. | |
| 5,831,266 A | 11/1998 | Jerominek et al. | |
| 5,952,661 A | 9/1999 | Klocek | |
| 5,962,909 A | 10/1999 | Jerominek et al. | |
| 6,020,582 A | 2/2000 | Bawolek et al. | |
| 6,028,312 A | 2/2000 | Wadsworth et al. | |
| 6,064,066 A | 5/2000 | Bevan et al. | |
| 6,094,281 A | 7/2000 | Nakai et al. | |
| 6,107,630 A * | 8/2000 | Mazurowski | G01J 5/061 250/336.1 |
| 6,249,002 B1 | 6/2001 | Butler | |
| 6,392,232 B1 | 5/2002 | Gooch et al. | |
| 6,515,285 B1 * | 2/2003 | Marshall | G01J 5/20 250/339.03 |
| 6,626,835 B1 * | 9/2003 | Kraus | G01J 5/0003 374/E13.003 |
| 6,690,014 B1 | 2/2004 | Gooch et al. | |
| 7,262,412 B2 | 8/2007 | Schimert et al. | |
| 7,309,865 B2 * | 12/2007 | Ikushima | G01J 5/02 250/338.1 |
| 7,375,331 B2 * | 5/2008 | Schimert | H01L 27/1465 250/338.1 |
| 7,470,904 B1 * | 12/2008 | Schweikert | G01J 5/04 250/338.1 |
| 7,579,663 B2 * | 8/2009 | Wan | B81C 1/00095 257/415 |
| 7,734,439 B2 * | 6/2010 | Timans | G01J 5/0003 702/99 |
| 7,752,742 B1 * | 7/2010 | Schweikert | G01J 5/04 228/213 |
| 7,795,585 B2 * | 9/2010 | Sogawa | H01L 23/047 250/338.1 |
| 7,957,926 B2 * | 6/2011 | Timans | G01J 5/0003 702/99 |
| 8,258,509 B2 * | 9/2012 | Kimata | G01L 21/12 257/467 |
| 8,296,091 B2 * | 10/2012 | Timans | G01J 5/0003 702/99 |
| 8,449,177 B2 * | 5/2013 | Kvisteroy | G01L 21/00 374/143 |
| 8,471,206 B1 * | 6/2013 | Kostrzewa | G01J 5/045 250/340 |
| 8,525,323 B2 * | 9/2013 | Yamazaki | G01J 5/04 257/414 |
| 8,573,836 B2 * | 11/2013 | Sasaki | H01L 21/67248 374/1 |
| 8,941,068 B2 * | 1/2015 | Fendler | H04N 5/33 250/352 |
| 2005/0077458 A1 | 4/2005 | Ma et al. | |

FOREIGN PATENT DOCUMENTS

| | | |
|---|---|---|
| EP | 0773435 | 5/1997 |
| EP | 0836092 | 4/1998 |

* cited by examiner

DEVICES AND METHODS FOR DETERMINING VACUUM PRESSURE LEVELS

CROSS REFERENCE TO RELATED APPLICATIONS

This application claims priority to and the benefit of U.S. Provisional Patent Application No. 61/798,586 filed Mar. 15, 2013 and entitled "DEVICES AND METHODS FOR DETERMINING VACUUM PRESSURE LEVELS," which is hereby incorporated by reference in its entirety.

This application claims priority to and the benefit of U.S. Provisional Patent Application No. 61/747,934 filed Dec. 31, 2012 and entitled "DEVICES AND METHODS FOR DETERMINING VACUUM PRESSURE LEVELS," which is hereby incorporated by reference in its entirety.

TECHNICAL FIELD

One or more embodiments of the invention relate generally to infrared detectors and, more particularly, to methods and devices for measuring vacuum pressure levels in an assembly used to encapsulate one or more infrared detectors.

BACKGROUND

Many different types of infrared detectors typically rely on high thermal isolation from the surrounding environment to achieve a desired level of performance. For example, an infrared detector may be encapsulated within a vacuum package to minimize thermal conduction via gas molecules.

A microbolometer and a silicon-on-insulator (SOI) diode are examples of these types of infrared detectors, which may be used within infrared cameras (e.g., various types of infrared imaging devices). The microbolometer and the SOI diode are typically fabricated on monolithic silicon substrates to form an image detector array, with each infrared detector of the image detector array functioning as a pixel to produce a two-dimensional image. The change in resistance of each infrared detector is translated into a time-multiplexed electrical signal by circuitry known as the read out integrated circuit (ROIC). The combination of the ROIC and the image detector array is commonly known as a focal plane array (FPA) or infrared FPA (IRFPA).

A typical FPA is situated within a vacuum package (also known as a vacuum package assembly) to provide a high vacuum environment that is generally required to achieve a desired sensitivity from the infrared detectors. However due to various factors (e.g., outgassing and/or leaks), the vacuum integrity of the vacuum package assembly degrades over time, which results typically in a gradual loss of vacuum pressure and consequently a reduction in sensitivity of the infrared detectors and an overall reduction in performance of the infrared camera.

Thus, there is a need for methods and devices to measure vacuum pressure levels of a vacuum package assembly, such as for a microbolometer FPA of an infrared camera.

SUMMARY

The present disclosure provides for various advantageous devices and methods, in accordance with one or more embodiments. For example, in accordance with an embodiment, a device includes a substrate, an infrared detector coupled to and thermally isolated from the substrate, and a heat shield. The heat shield is coupled to the substrate by a plurality of contacts and is disposed above the infrared detector to block external thermal radiation from being received by the infrared detector. The heat shield is configured to receive a current through the contacts to heat the heat shield to a first temperature. The infrared, detector is configured to detect the first temperature and provide an output signal that is related to a vacuum pressure within the device.

In accordance with another embodiment of the present disclosure, a method of determining a vacuum pressure level within a device includes applying a current to the heat shield to heat the heat shield to a first temperature; measuring a first output signal of the infrared detector; and determining a vacuum pressure level based on the first output signal and calibration information of the infrared detector at the first temperature. The heat shield is disposed above an infrared detector to block external thermal radiation from being received by the infrared detector.

In accordance with yet another embodiment of the present disclosure, a method of forming a device includes providing a substrate; forming an infrared detector on the substrate; forming a plurality of contacts on the substrate; and forming a heat shield coupled to the plurality of contacts. The infrared detector is thermally isolated from the substrate. The heat shield is disposed above the infrared detector to block external thermal radiation from being received by the infrared detector.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
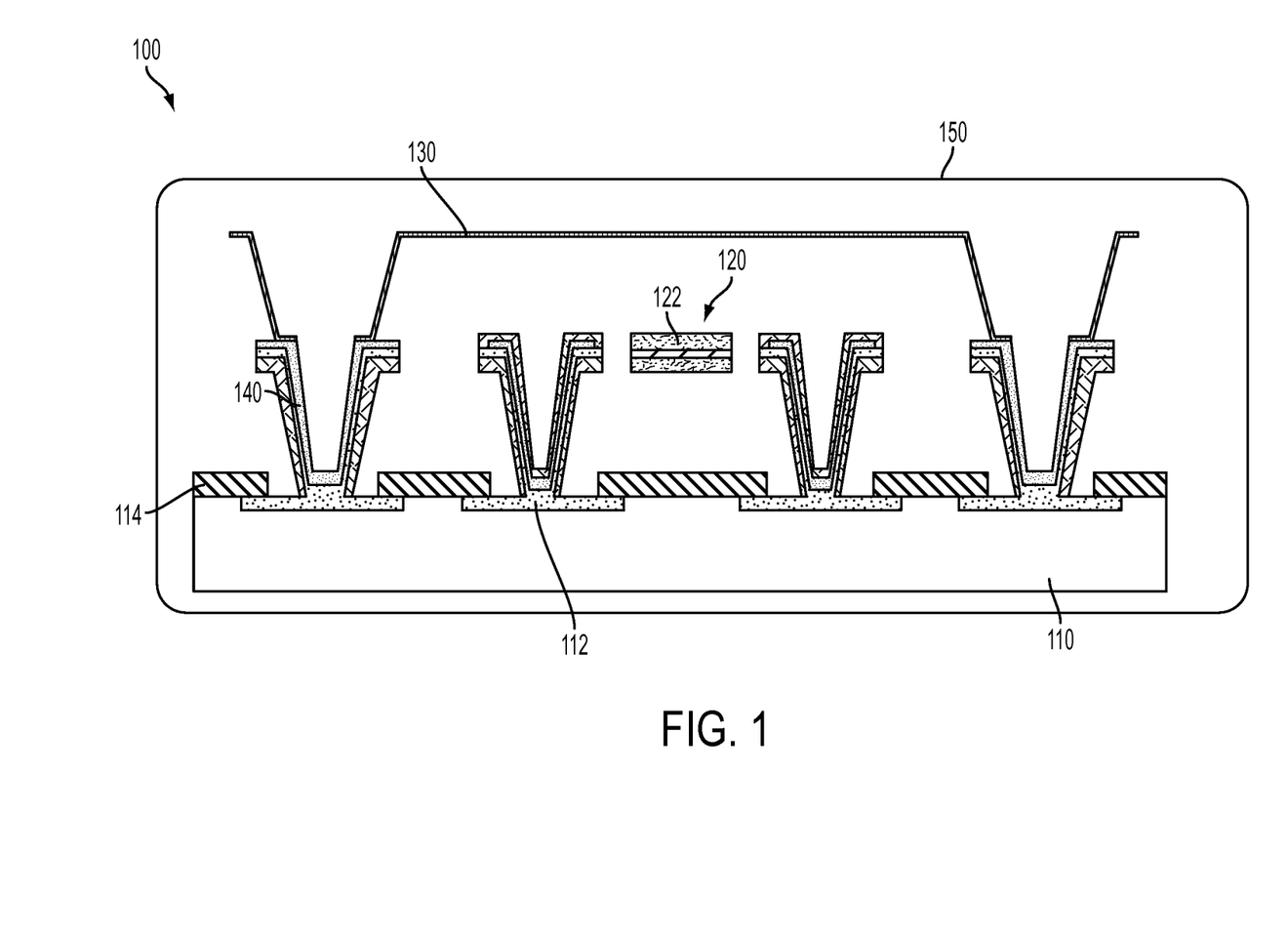
FIG. 1 illustrates a cross-sectional side view of a device in accordance with an embodiment of the present disclosure.
Figure 2:
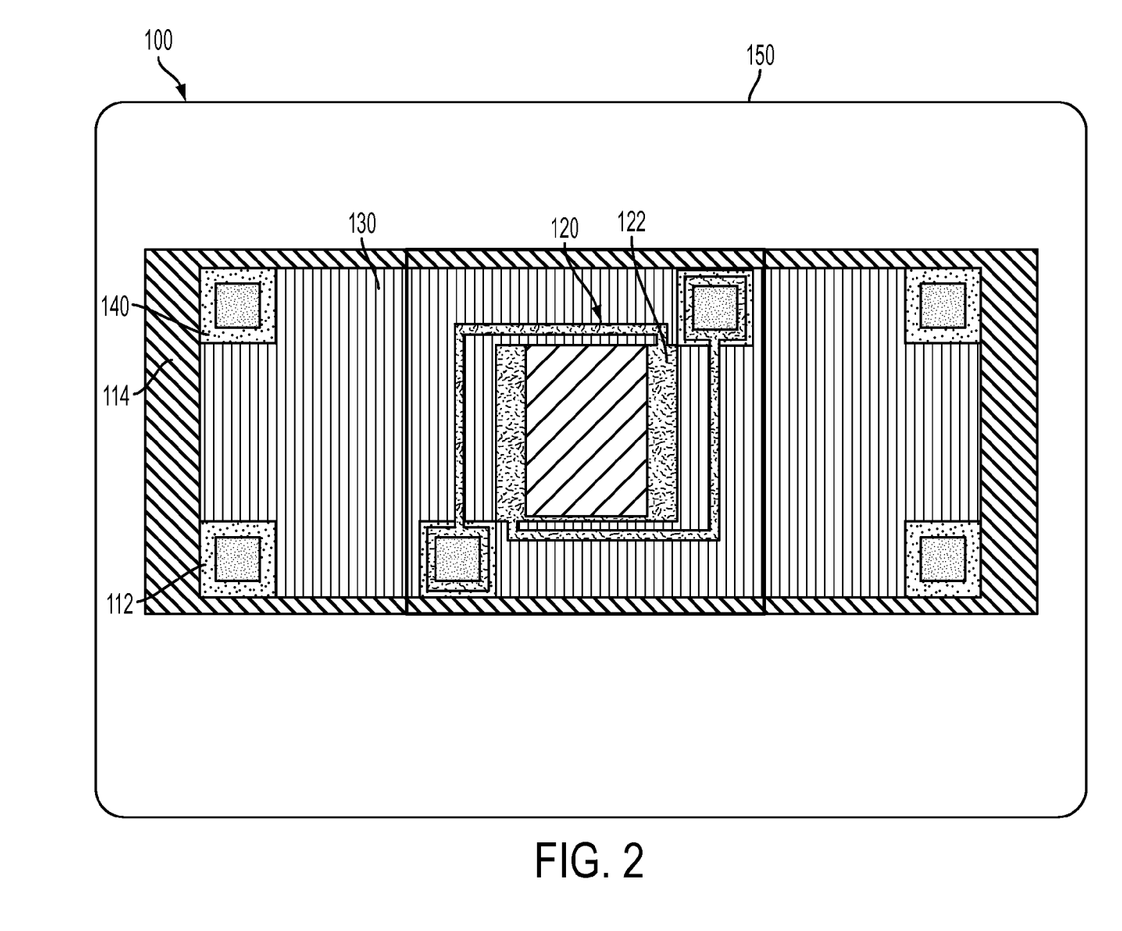
FIG. 2 illustrates a top view of a device in accordance with an embodiment of the present disclosure.

FIGS. 1 and 2 show a device 100 in accordance with an embodiment of the present disclosure. The device 100 includes a substrate 110, an infrared detector 120, a heat shield 130, and contacts 140 (e.g., legs). The device 100 is encapsulated in a vacuum package 160. While FIG. 1 shows only one infrared detector 120, it should be understood that more than one infrared detector 120 may be present in the device 100 and that there may also be infrared detectors within vacuum package 160 that function as an infrared imaging array, as discussed further herein.

Substrate 110 may be formed from silicon, silicon carbide, gallium arsenide, germanium, or any other suitable material that supports integration of semiconductor devices. A metal layer 112 and overglass layer 114 are formed on substrate 110. Substrate 110 may include a ROIC that reads out the output signal (e.g., as a function of the infrared detector's resistance) as a measure of thermal radiation incident on infrared detector 120.

Infrared detector 120 is coupled to substrate 110 (e.g., via associated contacts similar to contacts 140) and includes a resistive material 122 that changes resistance in response to a change in temperature of the resistive material 122, such as vanadium oxide or amorphous silicon. Infrared detector 120 includes a support structure, e.g., legs, which thermally isolate the resistive material from substrate 110, typically by suspending it above substrate 110. Thus, infrared detector 120 is coupled to substrate 110, but is thermally isolated from substrate 110. In general, infrared detector 120 may represent a conventional infrared detector that is constructed in a conventional manner with conventional materials.

In one embodiment, infrared detector 120 is integrally fabricated along with one or more microbolometers (not shown in FIG. 1) on substrate 110. Infrared detector 120 and the microbolometers have similar structural elements that can be fabricated concurrently on the same substrate. Infrared detector 120, however, has a heat shield 130 disposed over it that can be heated to a known temperature and is used to block external thermal radiation, while other ones of the microbolometers may form a microbolometer array to be used to capture thermal images, as would be understood by one skilled in the art.

FIG. 2 illustrates a top view of device 100 and shows heat shield 130 disposed over infrared detector 120. Heat shield 130 is coupled to substrate 110 via two or more contacts 140. As shown in FIG. 1, contacts 140 may form basket-shaped contacts with legs that are formed on substrate 110 to contact metal layer 112. In one embodiment, contacts 140 may be fabricated according to the methods and materials described in U.S. patent application Ser. No. 12/576,971, which is incorporated in its entirety by reference herein. Contacts 140, however, may represent various types of conventional contacts as would be known by one skilled in the art.

Heat shield 130 is disposed above infrared detector 120 to block incident or external thermal radiation from being received by infrared detector 120. Heat shield 130 is placed in a spaced relationship (e.g., spaced adjacent relationship) and in proximity to infrared detector 120 to minimize or block external thermal radiation. Any suitable distance may be employed for blocking external or undesired thermal radiation from reaching infrared detector 120.

Heat shield 130 is configured to receive a current through the contacts 140 to heat the heat shield 130 to a first temperature. In turn, infrared detector 120 is configured to detect the first temperature and provide an output signal that may be used to determine a vacuum pressure within vacuum package 150. Infrared detector 120 can be used as a vacuum pressure sensor because the heat received by infrared detector 120 from heat shield 130 produces a change in resistance related to vacuum level. The amount of heat received depends on the efficiency of heat transfer from heat shield 130 to infrared detector 120, which is related to vacuum pressure. Thus, the responsivity of infrared detector 120 to incident thermal radiation is dependent on the vacuum pressure level in the vacuum package 150, e.g., a high vacuum (low pressure) being optimum for responsivity of infrared detector 120.

In one embodiment, heat shield 130 may be a metallic reflective layer, for example, an optical blocking metallization layer such as gold-platinum-titanium (Au—Pt—Ti), although alternative metallization layers, e.g., gold-palladium-titanium (Au/Pd/Ti), gold-nickel-titanium (Au/Ni/Ti), aluminum, aluminum-titanium (Al/Ti), nickel chromium, vanadium oxide, etc. are also suitable. Heat shield materials may be applied using any suitable method, e.g., evaporation, sputtering, plating, etc. Heat shield 130 may be made of any material composition and thickness that may be heated (e.g., by application of current) and reflects or substantially reflects thermal energy (e.g., that is otherwise substantially non-optically transmissive).

Figure 3:
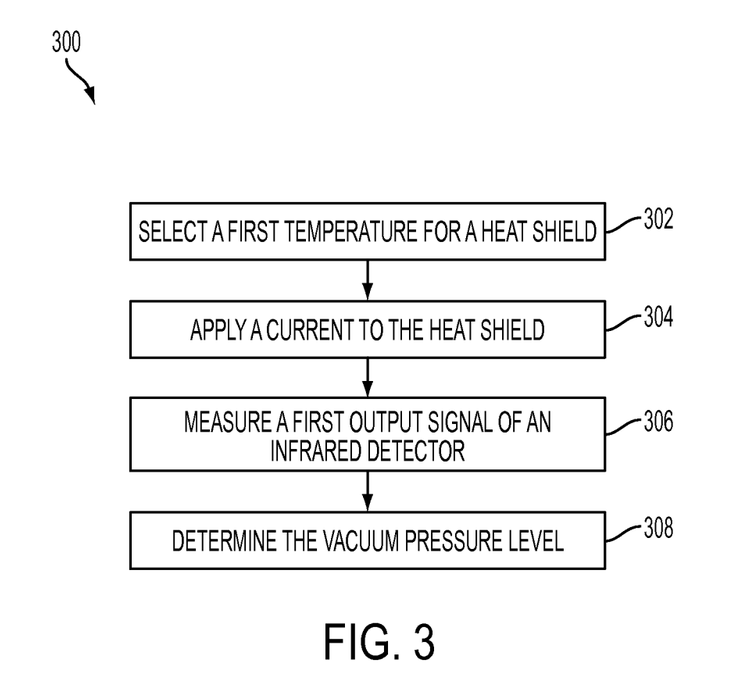
FIG. 3 illustrates a flowchart showing a method of determining a vacuum pressure level within a device in accordance with an embodiment of the present disclosure.

In accordance with an embodiment, FIG. 3 shows a flow diagram illustrating a method 300 for determining a vacuum pressure level. At block 302, a first temperature of heat shield 130 is selected. At block 304, a current is applied to heat shield 130 to heat the heat shield 130 to the first temperature. Thermal radiation emitted from heat shield 130 is then received by infrared detector 120.

At block 306, a first output signal of infrared detector 120 is measured. The first output signal is related to a vacuum pressure level of the device 100 that contains infrared detector 120 and heat shield 130.

At block 308, a vacuum pressure level is determined based on the first output signal and calibration information of infrared detector 120 at the first temperature. Infrared detector 120 and the method of using infrared detector 120 to detect vacuum levels are based on relating the output signal to the vacuum level. There may be many different techniques for generating the pressure (vacuum level) and output signal information.

In an exemplary embodiment, calibration for a particular infrared detector geometry and material is determined by measuring output signals for a plurality of vacuum pressure levels for infrared detector 120 at a known temperature, e.g., the first temperature or at a number of different temperatures. For instance, the output signal may be measured at a variety of different pressures between atmospheric pressure and various vacuum pressure levels. These output signals may then be stored in a lockup table for later use, and/or fitted to a calibration curve. Thus, since the value of the output signal varies as a function of pressure, the output signal may be measured at any pressure and compared to calibrated values of the output signal.

To determine the present vacuum pressure level, heat shield 130 is heated to the same temperature that the calibration information was taken, and the output signal of infrared detector 120 is measured. This output signal is then compared to the calibrated output signals, and the corresponding vacuum pressure level determined. For example, the measured output signal can be found on the calibration curve and its corresponding vacuum pressure level can then be found. Alternatively, the vacuum pressure level can be calculated, interpolated or extrapolated from calibrated measurements.

In some embodiments, calibration information at a second known temperature is also taken (or taken at various temperatures). Heat shield 130 is heated to this second temperature, and a second output signal is measured. A second vacuum pressure level is then determined from this second output signal. The first and second vacuum pressure levels can then be compared, and a more accurate determination of the vacuum pressure level can be made. In other embodiments, calibration information may be obtained at third, fourth, fifth, etc., temperatures, and output signals at these temperatures can be measured for increased accuracy.

In one embodiment, the calibration information may include measurements performed to determine threshold levels of performance over an expected operating range for the vacuum package assembly. The vacuum pressure condition of the device 100 may be determined by comparing the measured output signal to a corresponding stored threshold value. The threshold value, for example, may be selected from stored threshold values (e.g., within a lookup table or other database) that corresponds to infrared detector 120 and is associated with the temperature conditions of the test. As an example, the threshold value may be generated through interpolation or other known mathematical operations to generate the most appropriate threshold value for the given temperature conditions, as would be understood by one skilled in the art.

The threshold value can be used to determine whether the device 100 passes or fails (e.g., a vacuum integrity or performance test). In one embodiment, the output signal could be compared to a threshold value that is set based on the response of infrared detector 120 at a higher pressure (reduced vacuum) baseline. If the measured output signal falls below the threshold value, the device 100 fails the test. If the measured output signal is above the threshold value, the device 100 passes the test.

The vacuum pressure results may be stored, displayed to a user, or may be used to determine further action in accordance with one or more embodiments. For example, the test results, such as pass or fail may be displayed to the user for reference or a message, such as maintenance required, may be displayed to a user.

Figure 4:
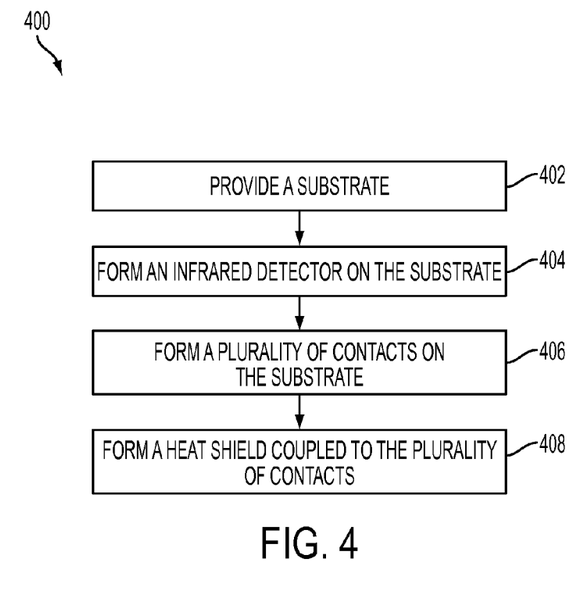
FIG. 4 illustrates a flowchart showing a method of forming a device in accordance with embodiments of the present disclosure.

In accordance with an embodiment, FIG. 4 shows a flow diagram illustrating a method 400 for forming the device 100. At block 402, a substrate 110 is provided. At block 404, an infrared detector 120 is formed on substrate 110 so that infrared detector 120 is thermally isolated from substrate 110 using conventional methods known by those skilled in the art. At block 406, a plurality of contacts 140 are formed on substrate 110 using conventional methods known by those skilled in the art. At block 408, a heat shield 130 is coupled to the plurality of contacts 140 so that heat shield 130 is disposed above infrared detector 120 to block external thermal radiation from being received by infrared detector 120.

Figure 5A:
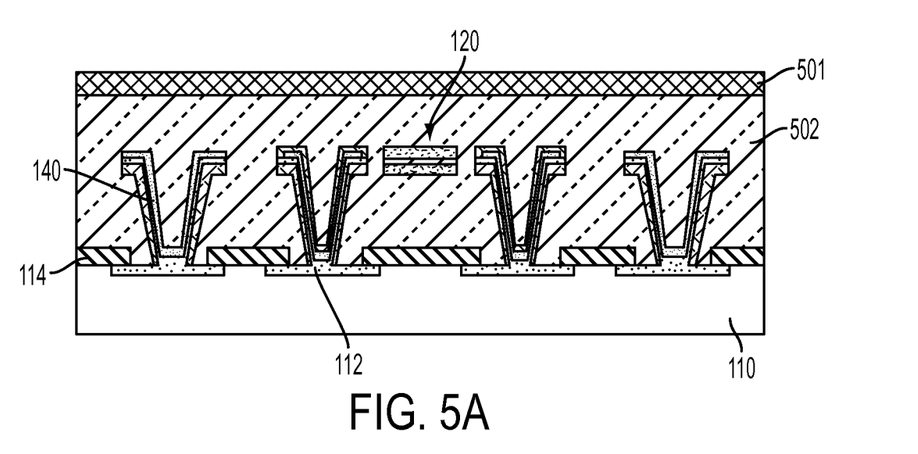
FIGS. 5A to 5C illustrate a processing overview for forming a device in accordance with embodiments of the present disclosure.
Figure 5B:
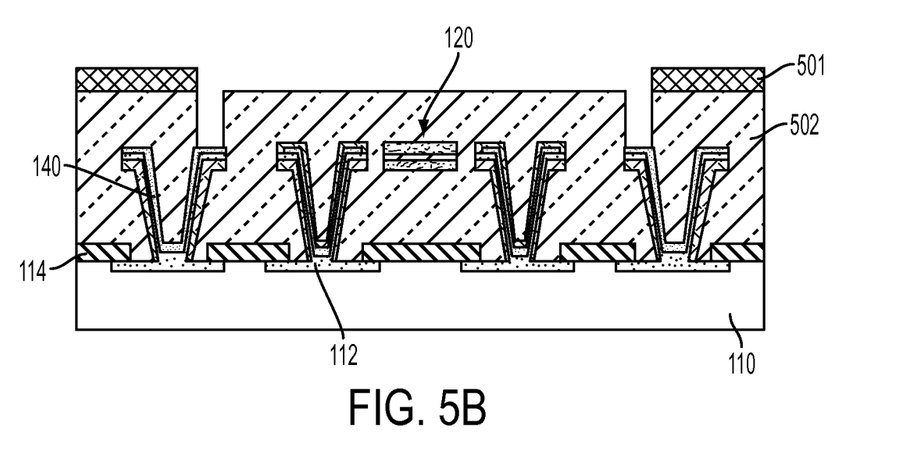
Figure 5C:
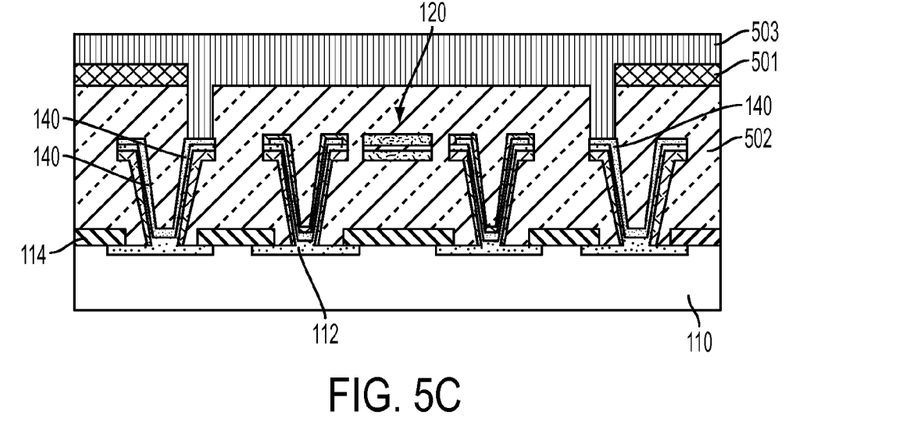

FIGS. 5A through 5C illustrate a processing overview (cross-sectional side views) for manufacturing a heat shield 130, in accordance with an embodiment of the present disclosure. As shown in FIG. 5A, substrate 110 with metal layer 112, overglass layer 114, infrared detector 120, and contacts 140 is coated with a polyimide coating 502 and a photoresist layer 501 Photoresist layer 501 is exposed and developed. Then, an etching process is performed for photoresist layer 501 and polyimide coating 502 (FIG. 5B). Next, a metal layer 503 is deposited on photoresist layer 501, polyimide coating 502, and certain ones of contacts 140 (FIG. 5C), followed by lift-off and release to form heat shield 130 (e.g., as shown in FIG. 1).

In accordance with an embodiment for a specific processing implementation example, in reference to FIGS. 5A through 5C, a release layer (e.g., a second release layer, such as the polyimide coating 502 or other type of material for layer 502) is provided. A coating, such as photoresist layer 501 is provided and a pattern is exposed and developed (e.g., a first pattern, such as for a hole to etch through the release layer). A second pattern (e.g., a lift-off pattern) is exposed. The release layer is then etched (to make an opening to certain ones of contacts 140) and photoresist layer 501 is developed (e.g., as shown in FIG. 5B). Metal layer 503 is then deposited (e.g., as shown in FIG. 5C) and photoresist layer 501 is removed (lift-off and release) to form heat shield 130 (e.g., as shown in FIG. 1).

In accordance with an embodiment for another specific processing implementation example, in reference generally to FIGS. 5A through 5C, a release layer (e.g., a second release layer, such as the polyimide coating 502 or other type of material for layer 502) is provided. A coating, such as photoresist layer 501 is provided and a pattern is exposed. The release layer is then etched (to make an opening to certain ones of contacts 140) and photoresist layer 501 is removed. A coating, such as photoresist layer 501 is provided and patterned (lift-off pattern) and metal layer 503 is then deposited (e.g., as shown in FIG. 5C). Photoresist layer 501 is removed (lift-off and release) to form heat shield 130 (e.g., as shown in FIG. 1).

In view of the present disclosure, it will be appreciated that the devices and methods as set forth herein may provide advantages over conventional techniques. For example, the infrared detector 120 with heat shield 130 within device 100 may be used to detect vacuum pressure leaks and to measure vacuum package integrity of device 100 and provide warnings of significant performance reductions. In some embodiments, the device 100 is used in uncooled ROICs to determine the vacuum pressure inside the vacuum package assembly.

Figure 6:
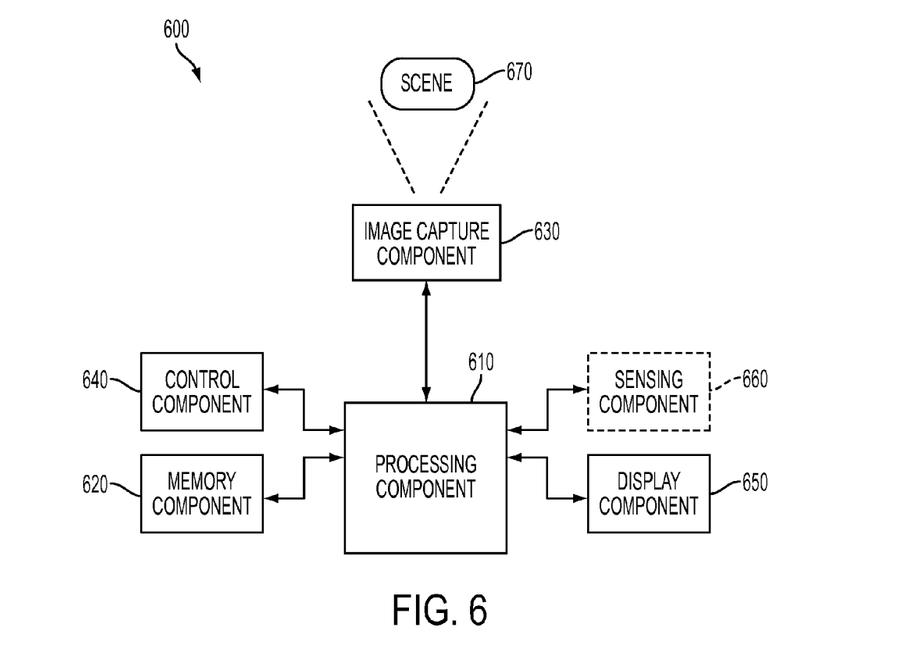
FIG. 6 illustrates a block diagram of a system for capturing images in accordance with an embodiment of the present disclosure.

In accordance with one or more embodiments, the devices and methods described herein may be performed on a vacuum package assembly, such as within an infrared camera. For example, FIG. 6 shows a block diagram illustrating a system 600 (e.g., an infrared camera, including any type of infrared imaging system) for capturing images and processing in accordance with one or more embodiments. System 600 comprises, in one implementation, a processing component 610, a memory component 620, an image capture component 630, a control component 640, and/or a display component 650. System 600 may further include a sensing component 660.

System 600 may represent for example an infrared imaging device to capture and process images, such as video images of a scene 670. The system 600 may represent any type of infrared camera adapted to detect infrared radiation and provide representative data and information (e.g., infrared image data of a scene) or may represent more generally any type of electro-optical sensor system. In one example, system 600 may represent an infrared camera, a dual band imager such as a night vision imager that operates to sense reflected visible and/or SWIR light for high resolution images and LWIR radiation for thermal imaging, or an imager for sensing both short wave and long wave radiation simultaneously for providing independent image information. System 600 may comprise a portable device and may be incorporated, e.g., into a vehicle (e.g., an automobile or other type of land-based vehicle, an aircraft, a marine craft, or a spacecraft) or a non-mobile installation requiring infrared images to be stored and/or displayed and may comprise a distributed networked system.

In various embodiments, processing component 610 may comprise any type of a processor or a logic device (e.g., a programmable logic device (PLD) configured to perform processing functions). Processing component 610 may be adapted to interface and communicate with components 620, 630, 640, and 650 to perform method and processing steps and/or operations, as described herein, including conventional system processing functions as would be understood by one skilled in the art.

Memory component 620 comprises, in one embodiment, one or more memory devices adapted to store data and information, including for example infrared data and information. Memory device 620 may comprise one or more various types of memory devices including volatile and non-volatile memory devices, and/or a machine-readable medium capable of storing data in a machine-readable format. Processing component 610 may be adapted to execute software stored in memory component 620 so as to perform method and process steps and/or operations described herein.

Image capture component 630 comprises, in one embodiment, any type of image sensor, such as for example one or more infrared sensors (e.g., any type of multi-pixel infrared detector, such as microbolometer detectors and focal plane arrays) for capturing infrared image data (e.g., still image data and/or video data) representative of an image, such as scene 670. For example for an embodiment, image capture component 630 may include an array of microbolometers that form an infrared imaging array and further include one or more infrared detectors 120 with heat shields 130 to monitor vacuum pressure within the vacuum package assembly of image capture component 630.

In one implementation, the infrared sensors of image capture component 630 provide for representing (e.g., converting) the captured image data as digital data (e.g., via an analog-to-digital converter included as part of the infrared sensor or separate from the infrared sensor as part of system 700). In one aspect, the infrared image data (e.g., infrared video data) may comprise non-uniform data (e.g., real image data) of an image, such as scene 670. Processing component 610 may be adapted to process the infrared image data (e.g., to provide processed image data), store the infrared image data in memory component 620, and/or retrieve stored infrared image data from memory component 620. For example, processing component 610 may be adapted to process infrared image data stored in memory component 620 to provide processed image data and information (e.g., captured and/or processed infrared image data).

Control component 640 comprises, in one embodiment, a user input and/or interface device. For example, the user input and/or interface device may represent a rotatable knob (e.g., potentiometer), push buttons, slide bar, touch screen, keyboard, etc., that is adapted to generate a user input control signal. Processing component 610 may be adapted to sense control input signals from a user via control component 640 and respond to any sensed control input signals received therefrom. Processing component 610 may be adapted to interpret such a control input signal as a parameter value, as generally understood by one skilled in the art.

In one embodiment, control component 640 may comprise a control unit (e.g., a wired or wireless handheld control unit) having push buttons adapted to interface with a user and receive user input control values. In one implementation, the push buttons of the control unit may be used to control various functions of the system 600, such as autofocus, menu enable and selection, field of view, brightness, contrast, noise filtering, high pass filtering, low pass filtering, and/or various other features as understood by one skilled in the art.

Display component 650 comprises, in one embodiment, an image display device (e.g., a liquid crystal display (LCD) or various other types of generally known video displays or monitors, including touch screen displays). Processing component 610 may be adapted to display image data and information on the display component 650. Processing component 610 may be adapted to retrieve image data and information from memory component 620 and display any retrieved image data and information on display component 650. Display component 650 may comprise display electronics, which may be utilized by processing component 610 to display image data and information (e.g., infrared images). Display component 650 may be adapted to receive image data and information directly from image capture component 630 via the processing component 610, or the image data and information may be transferred from memory component 620 via processing component 610.

Sensing component 660 comprises, in one embodiment, one or more sensors of various types, depending on the application or implementation requirements, as would be understood by one skilled in the art. The sensors of optional sensing component 660 provide data and/or information to at least processing component 610. In one aspect, processing component 610 may be adapted to communicate with sensing component 660 (e.g., by receiving sensor information from sensing component 660) and with image capture component 630 (e.g., by receiving data and information from image capture component 630 and providing and/or receiving command, control, and/or other information to and/or from one or more other components of system 600).

In various implementations, sensing component 660 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 660 may represent conventional sensors as generally known by one skilled in the art for monitoring various conditions (e.g., environmental conditions) that may have an effect (e.g., on the image appearance) on the data provided by image capture component 630.

In some implementations, optional sensing component 660 (e.g., one or more of sensors) may comprise devices that relay information to processing component 610 via wired and/or wireless communication. For example, optional sensing component 660 may be adapted to receive information from a satellite, through a local broadcast (e.g., RF) transmission, through a mobile or cellular network and/or through information beacons in an infrastructure (e.g., a transportation or highway information beacon infrastructure), or various other wired and/or wireless techniques.

In various embodiments, components of system 600 may be combined and/or implemented or not, as desired or depending on the application or requirements, with system 600 representing various functional blocks of a related system. In one example, processing component 610 may be combined with memory component 620, image capture component 630, display component 650, and/or optional sensing component 660. In another example, processing component 610 may be combined with image capture component 630 with only certain functions of processing component 610 performed by circuitry (e.g., a processor, a microprocessor, a logic device, a microcontroller, etc.) within image capture component 630. Furthermore, various components of system 600 may be remote from each other (e.g., image capture component 630 may comprise a remote sensor with processing component 610, etc. representing a computer that may or may not be in communication with image capture component 630).

Figure 7:
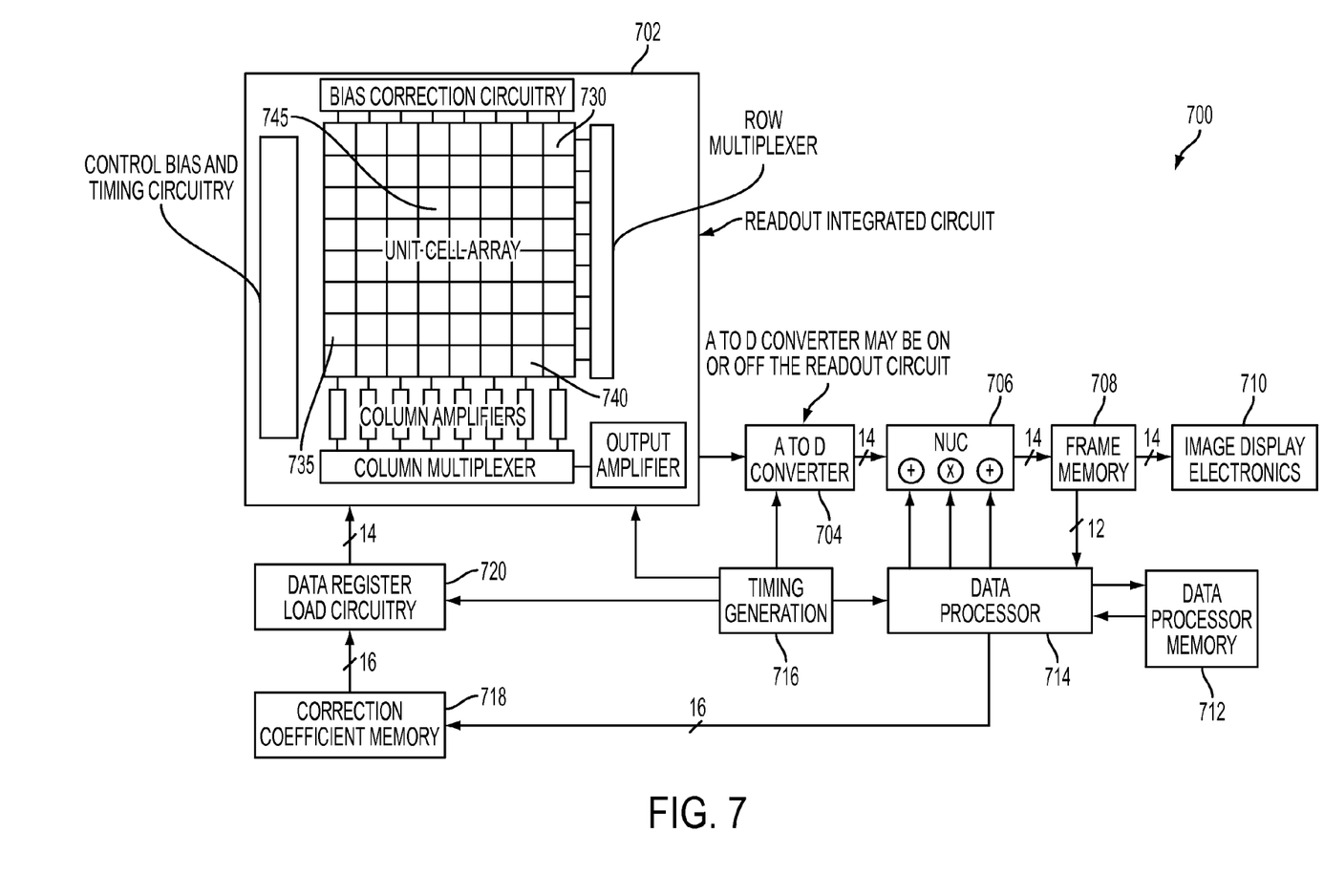
FIG. 7 illustrates a block diagram illustrating an infrared camera in accordance with one or more embodiments of the present disclosure.

FIG. 7 shows a block diagram illustrating a specific implementation example for an infrared camera 700 in accordance with one or more embodiments. Infrared camera 700 may represent a specific implementation of system 600 (FIG. 6), as would be understood by one skilled in the art.

Infrared camera 700 (e.g., a microbolometer array having a readout integrated circuit with bias-correction circuitry and interface system electronics) includes a readout integrated circuit (ROIC) 702, which may include the microbolometer array (e.g., unit cell array) having a plurality of contacts, control circuitry, timing circuitry, bias circuitry, row and column addressing circuitry, column amplifiers, and associated electronics to provide output signals that are digitized by an analog-to-digital (A/D) converter 704. The A/D converter 704 may be located as part of or separate from ROIC 702.

As shown, the microbolometer unit cell array includes a plurality of infrared detectors (e.g., in this example, microbolometers), including infrared detectors 730, 735, 740, and 745 as disclosed herein. One or more of infrared detectors 730, 735, 740, and 745 may include heat shields 130 as set forth herein so as to monitor the vacuum pressure within the vacuum package assembly containing ROIC 702 in accordance with the techniques disclosed herein. Alternatively, one or more of infrared detectors 730, 735, 740, and 745 with corresponding heat shields 130 may be disposed near (but not necessarily coupled to the unit cell array) to perform their vacuum pressure monitoring function (e.g., may be arranged in any suitable manner to perform a vacuum pressure level in the vacuum package assembly containing ROIC 702).

It should be understood that infrared detectors that are used to perform the vacuum pressure monitoring functionality, as set forth herein, may be made in the same way (e.g., same materials and semiconductor manufacturing processes) as the infrared detectors of the array that will be used for infrared imaging. However, the infrared detectors that are used to perform the vacuum pressure monitoring may be implemented to be of a different size (e.g., larger) than the infrared detectors of the array used for infrared imaging (e.g., to improve performance and provide increased sensitivity or responsivity).

The output signals from A/D converter 704 are adjusted by a non-uniformity correction circuit (NUC) 706, which applies temperature dependent compensation as would be understood by one skilled in the art. After processing by NUC 706, the output signals are stored in a frame memory 708. The data in frame memory 708 is then available to image display electronics 710 and a data processor 714, which may also have a data processor memory 712. A timing generator 716 provides system timing.

Data processor 714 generates bias-correction data words, which are loaded into a correction coefficient memory 718. A data register load circuit 720 provides the interface to load the correction data into ROIC 702. In this fashion, variable circuitry such as variable resistors, digital-to-analog converters, biasing circuitry, which control voltage levels, biasing, frame timing, circuit element values, etc., are controlled by data processor 714 so that the output signals from ROIC 702 are uniform over a wide temperature range.

It should be understood that various functional blocks of infrared camera 700 may be combined and various functional blocks may also not be necessary, depending upon a specific application and specific requirements. For example, data processor 714 may perform various functions of NUC 706, while various memory blocks, such as correction coefficient memory 718 and frame memory 708, may be combined as desired.

It is understood that this disclosure provides many different embodiments, or examples, for implementing different features of the invention. Specific examples of components and arrangements are described herein. However, these are, of course, merely examples and are not intended to be limiting. Furthermore, various features may be arbitrarily drawn in different scales for the sake of simplicity and clarity.

Embodiments described above illustrate but do not limit the disclosure. It should also be understood that numerous modifications and variations are possible in accordance with the principles of the present disclosure. Accordingly, the scope of the disclosure is defined only by the following claims.

The invention claimed is:

1. A device, comprising:
   a substrate;
   an infrared detector coupled to and thermally isolated from the substrate; and
   a heat shield coupled to the substrate by a plurality of contacts, the heat shield disposed above the infrared detector and configured to block thermal radiation generated by sources external to the infrared detector from being received by the infrared detector, wherein the heat shield is configured to receive a current through the contacts to heat the heat shield to a known temperature, and wherein the infrared detector is configured to provide an output signal associated with a detected temperature of the heat shield, and wherein the output signal is associated with a vacuum pressure within the device.

2. The device of claim 1, wherein the device comprises an infrared imaging device, and wherein the infrared imaging device further comprises: an array of infrared detectors, coupled to and thermally isolated from the substrate, configured to capture infrared images, wherein the infrared detectors configured to capture infrared images comprise unshielded infrared detectors; a memory configured to store calibration data; and a processor configured to receive the output signal and determine the vacuum pressure within the device based on the output signal and the calibration data.

3. The device of claim 2, wherein the calibration data comprises a calibration equation, a series of calibration data for output signal values versus vacuum pressure, and/or a lookup table storing vacuum pressure data and corresponding output signal values.

4. The device of claim 1, wherein the substrate comprises a readout integrated circuit.

5. The device of claim 1, wherein the heat shield comprises a metal.

6. The device of claim 5, wherein the metal comprises vanadium oxide, nickel chromium, aluminum, or mixtures thereof.

7. The device of claim 1, wherein responsivity of the infrared detector is related to a vacuum pressure level of a vacuum pressure assembly that contains the infrared detector and the heat shield.

8. The device of claim 1, further comprising a processing component configured to determine a vacuum pressure level based on the output signal and calibration information of the infrared detector.

9. The device of claim 8, wherein the device comprises an infrared imaging system, and wherein the infrared imaging device system further comprises:

an array of infrared detectors, coupled to and thermally isolated from the substrate, configured to capture infrared images, wherein the infrared detectors configured to capture infrared images comprise unshielded infrared detectors;

a memory configured to store calibration data; and a processor configured to control the current provided to the heat shield and receive the output signal and determine the vacuum pressure within the device based on the output signal and the calibration data.

10. The device of claim 9, wherein the processor is configured to control the current to provide different current levels to the heat shield and receive the corresponding output signals from the infrared detector to determine the vacuum pressure with the device.

11. A method of determining a vacuum pressure level within a device, the method comprising: applying a current to a heat shield to heat the heat shield to a known temperature, the heat shield disposed above an infrared detector and configured to block thermal radiation generated by sources external to the infrared detector from being received by the infrared detector; measuring a first output signal of the infrared detector, wherein the output signal is associated with a detected temperature of the heat shield; and determining a vacuum pressure level based on the first output signal and calibration information associated with the infrared detector at the known temperature.

12. The method of claim 11, wherein the calibration information comprises an equation and/or a lookup table.

13. The method of claim 11, wherein the calibration information is obtained by calibrating the first output signal of the infrared detector at various vacuum pressure levels.

14. The method of claim 11, further comprising applying different currents to the heat shield to obtain different temperatures.

15. The method of claim 14, further comprising obtaining calibration information at the different temperatures.

16. The method of claim 11, further comprising storing the calibration information in a lookup table.

17. The method of claim 11, wherein the calibration information comprises a threshold value for the first output signal, and wherein the threshold value is set for a minimum acceptable vacuum pressure level.

18. A method of calibrating the device of claim 1, the method comprising:
applying one or more current levels to the heat shield to heat the heat shield to one or more respective known temperatures based on the current levels;
measuring output signals of the infrared detector associated with one or more detected temperatures of the heat shield; and
determining the vacuum pressure level based on the one or more output signals and calibration information associated with the infrared detector at the one or more temperatures.

19. A method of forming a device, the method comprising:
providing a substrate;
forming an infrared detector on the substrate, wherein the infrared detector is thermally isolated from the substrate;
forming a plurality of contacts on the substrate; and
forming a heat shield coupled to the plurality of contacts, wherein the heat shield is disposed above the infrared detector and configured to block thermal radiation generated by sources external to the infrared detector from being received by the infrared detector.

20. The method of claim 19, wherein the forming the heat shield comprises deposition, patterning and/or etching processes, and wherein the method further comprises forming an array of infrared detectors on the substrate to perform infrared imaging.

* * * * *